(No Model.)

C. L. WOODWARD.
POTATO PLANTING AND FERTILIZING MACHINE.

No. 253,569. Patented Feb. 14, 1882.

Witnesses.
A. W. Sangster.
N. J. Gray

Inventor
Charles L. Woodward
By James Sangster
Atty.

N. PETERS, Photo-Lithographer, Washington, D. C.

UNITED STATES PATENT OFFICE.

CHARLES L. WOODWARD, OF ANGOLA, NEW YORK.

POTATO-PLANTING AND FERTILIZING MACHINE.

SPECIFICATION forming part of Letters Patent No. 253,569, dated February 14, 1882.

Application filed November 5, 1880. (No model.)

*To all whom it may concern:*

Be it known that I, CHARLES L. WOODWARD, a citizen of the United States, residing in Angola, in the county of Erie and State of New York, have invented certain new and useful Improvements in Potato-Planting and Fertilizing Machines, of which the following is a specification.

The object of my invention is to produce a machine that will cut the furrow, drop the potatoes and fertilizing material into it, and cover them up; and it consists of a wheel having on its periphery a series of pockets, in combination with a loose roller arranged in each pocket so the potatoes will enter more easily, and to assist in preventing them from clogging as they enter the pocket from the hopper.

My invention further consists of a wheel having a series of pockets each of which is provided with a loose roller, as specified, in combination with a hopper having a roller operated by a belt and pulley, for the purpose of assisting in keeping the surplus potatoes away from what may be in the pockets, and preventing them from clogging or being drawn in between the periphery of the wheel and a shield which keeps the materials in place, as will be more clearly hereinafter shown by reference to the drawings, in which—

Figure 1:
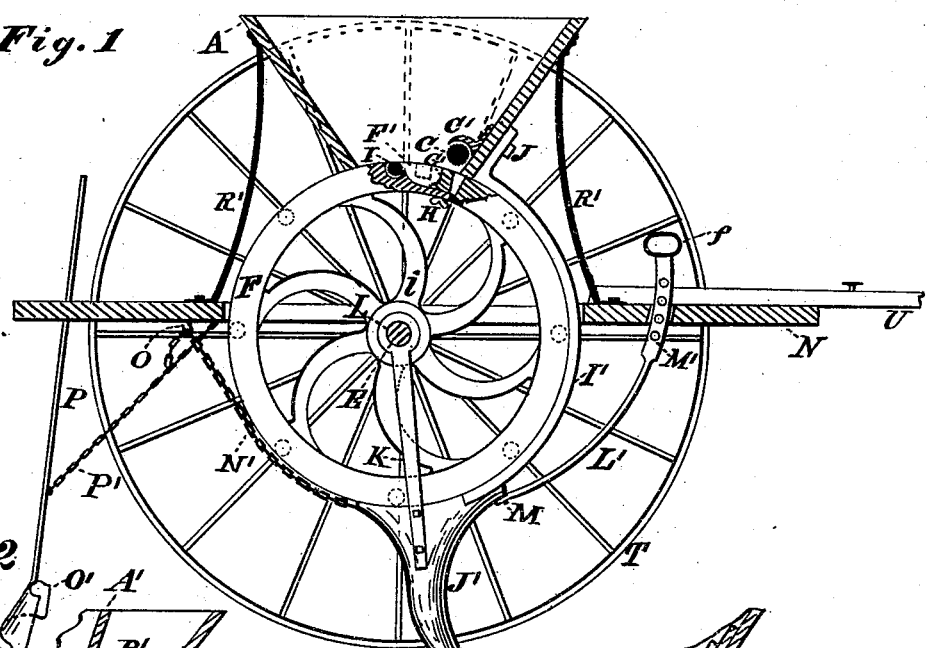
Figure 2:
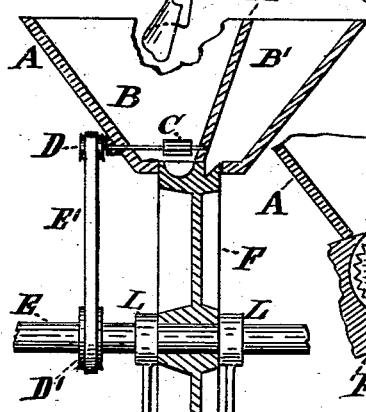
Figure 3:
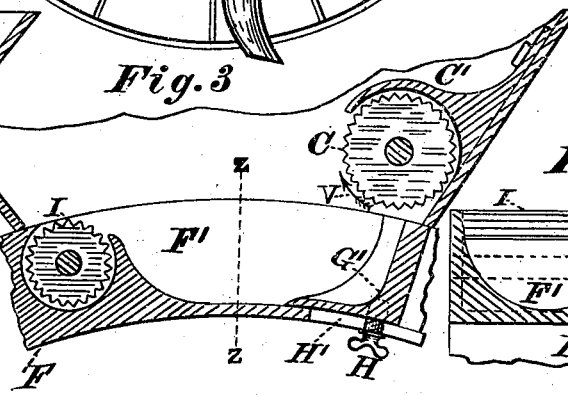
Figure 4:
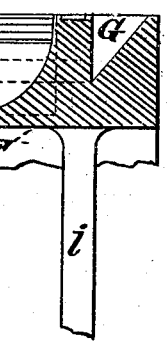
Figure 5:
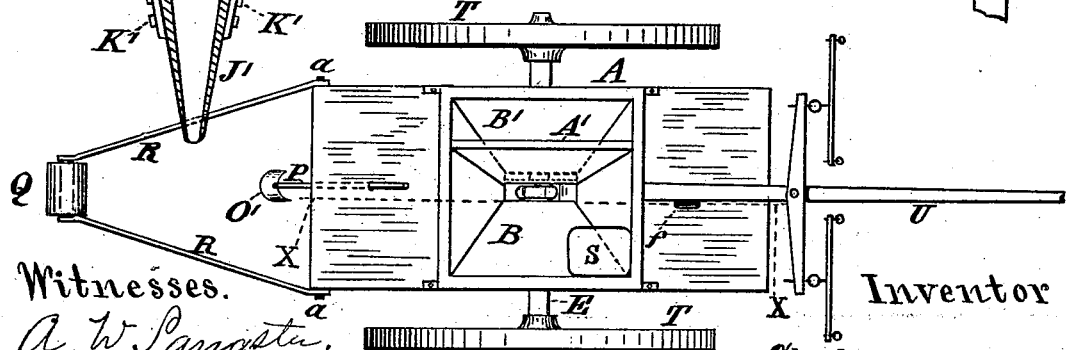

Figure 1 represents a side elevation in section through line X X, Fig. 5, showing a portion of the pocket-wheel broken away through the side of the pocket. Fig. 2 is a central cross-section through the hopper, the pocket-wheel, and the leg. Fig. 3 is a longitudinal section through a portion of the hopper and feed-wheel. Fig. 4 represents a cross-section through a portion of the pocket-wheel, through line z z, Fig. 3; and Fig. 5 is a plan view of the machine complete.

A represents the hopper. It is provided with a partition, A', so as to divide it into two receptacles—one, B, to hold the potatoes, and B' to hold any suitable phosphate or fertilizing material. Within the hopper, in the space B, is arranged in suitable bearings a corrugated roller, C, having a shield, C', above it. (See Figs. 1 and 3.) The shaft of said roller C extends out through the hopper on one side, and is provided with a pulley, D, which is connected in the usual way with a pulley, D', on the main shaft B, by a belt, E'. (See Fig. 2.)

F represents the pocket-wheel. It is rigidly connected to the main shaft, and is provided with a double series of pockets, F' and G, arranged around the periphery of the wheel, the pockets F' being for the potatoes and G for the fertilizing material. The rim of said wheel may be supported either by arms i, as shown in Fig. 1, or a thin flat disk, as shown in section in Fig. 2. The pockets F' are made adjustable, so as to be used for larger or smaller material, by means of a small piece, G', and a set-screw, H, arranged to move in a longitudinal slot, H'. (See Fig. 3.) At one end of each pocket is a small corrugated roller, I, arranged across the opening F' and partly inclosed, as shown in Fig. 3, and fitted in bearings, so as to turn easily. If desired, said roller may be made plain, without corrugations.

The wheel F is provided with eight pockets F' and eight pockets G; but the number may be more or less.

I' is a shield, fastened to the hopper by one or more bolts, J, and arranged to fit partly around the wheel, as shown in Fig. 1.

At the lower part of the wheel F is a leg, J', through which the potatoes or other materials drop every time the pockets come opposite the upper opening of the leg. The said leg is held close to the periphery of the wheel, as shown in Figs. 1 and 2, by means of two side bars, K, bolted to it by bolts K' and held to the shaft E by eyes L, through which said shaft passes, as shown in Figs. 1 and 2, so that if left without any other support it would swing thereon. To prevent it from swinging back a curved bar, L', is fastened to it by one or more bolts, M, and its upper part is held by a wooden pin passed through one of the holes M' above the platform N. The object in using a wooden pin is that it will break before breaking other parts of the machine in case the leg runs against a stone or other obstruction, and thereby allow the leg to swing back far enough to pass over it.

It will be seen that by having a number of holes M' the leg may be adjusted to cut furrows of more or less depth.

The leg J' is held from being moved forward by means of a chain, N', which is also adjustable, as any one of the links of the chain may be fastened to the hook O.

The platform N is provided with the usual appliances for hitching the horses thereto.

To cover the furrow after the seed and fertilizing material have been placed therein, I employ a curved plate, O', connected to the platform by a handle, P, fastened by a pin or other well-known means, and which is held in its proper position by a chain, P'. (See Fig. 1.) When it is necessary to roll the furrow a small roller, Q, is jointed to the back of the platform by arms or bars R, as shown in Fig. 5. The hopper is secured in its proper position to the platform by means of braces R', and it is provided with a seat, S, for the driver. The machine is fitted with the usual wheels, T, connected thereto in the ordinary way for such purposes, so that when the machine moves forward they turn and operate the pocket-wheel, and when moving backward they turn loosely on the shaft E without moving the pocket-wheel.

The operation of the machine is as follows: The hopper B is filled with the material to be planted and B' with fertilizing material, and the machine, being moved forward, causes the pocket-wheel F to turn, and as the pockets pass the mouth of the hopper the pocket G becomes filled with fertilizing material and F' with potatoes, both of which are drawn under the shield I as the wheel and pockets move under it. The corrugated roller C, turning in the direction of the arrow V, (see Fig. 3,) keeps the surplus potatoes from clogging with what may be in the pocket and prevents them from being drawn in between the shield and wheel. The roller I also assists in keeping the potatoes from clogging, as it turns freely and thereby moves under them without rubbing or cutting. Each pocket is thus filled in succession, and as they pass the top of the leg J' they drop their contents through it into the furrow it cuts, which is covered up by the covering device O'. It is then rolled by the roller Q when required.

I claim—

1. The wheel F, secured to the shaft E and provided with a series of adjustable pockets, F', having a loose roller, I, for the purposes specified, in combination with a hopper, A, a shield, I', and a leg, J', for the purposes described.

2. In a planting and fertilizing machine, a wheel, F, having a series of pockets, F', provided with a loose roller, I, in combination with a hopper having a roller, C, and a suitable mechanism, substantially as specified, for operating it, for the purposes described.

CHARLES L. WOODWARD.

Witnesses:
JAMES SANGSTER,
NUTTER I. GRAY.